March 15, 1949.   H. B. HUDSON   2,464,232
TIRE VULCANIZER
Filed May 21, 1946   4 Sheets-Sheet 1
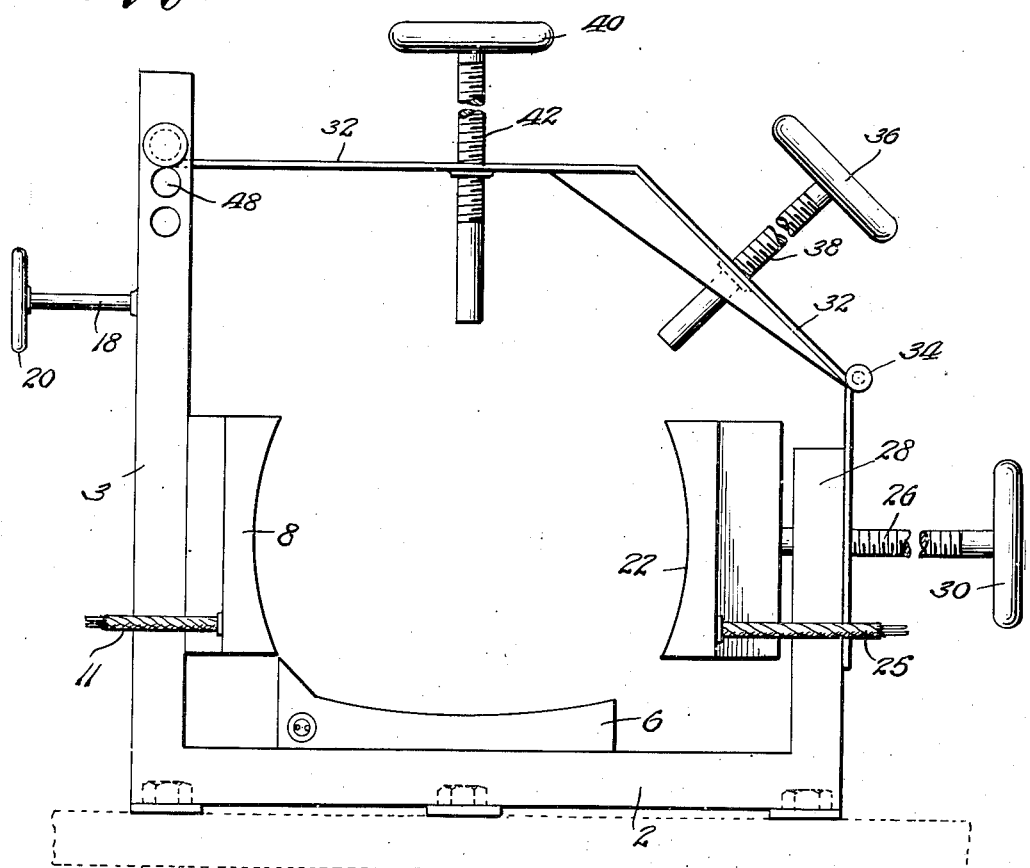
INVENTOR.
Henry B. Hudson
BY Victor J. Evans & Co.
ATTORNEYS

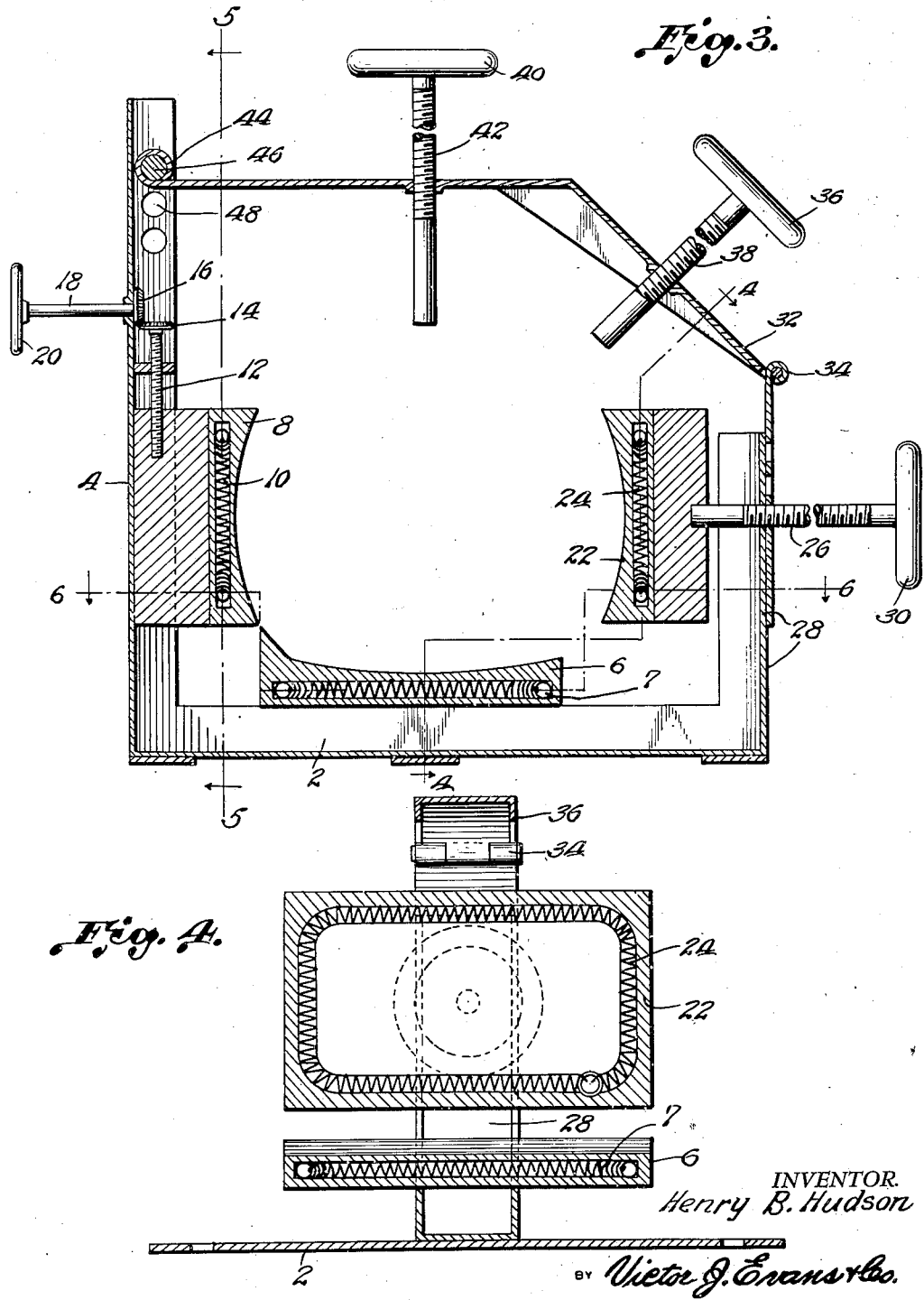

March 15, 1949. H. B. HUDSON 2,464,232
TIRE VULCANIZER
Filed May 21, 1946 4 Sheets-Sheet 3
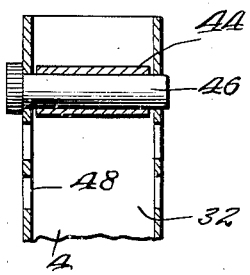
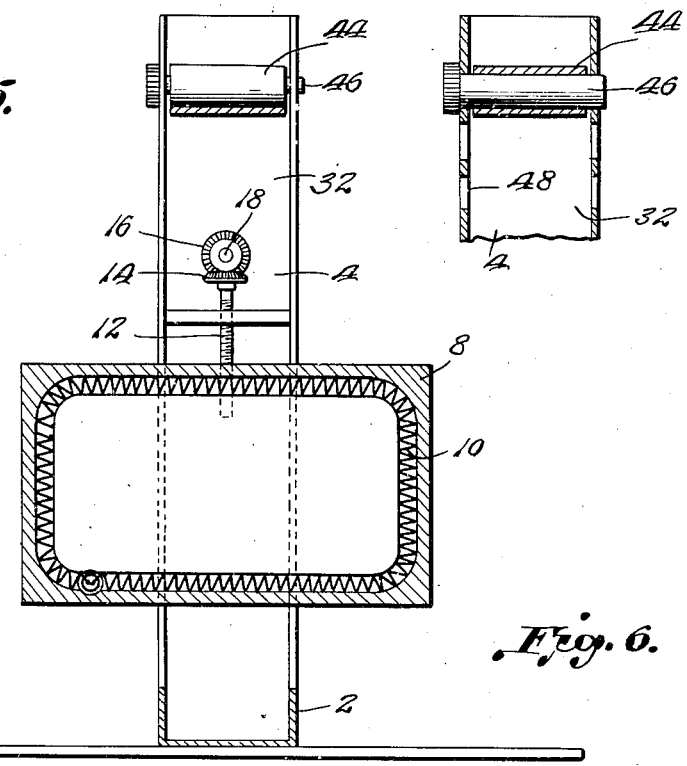
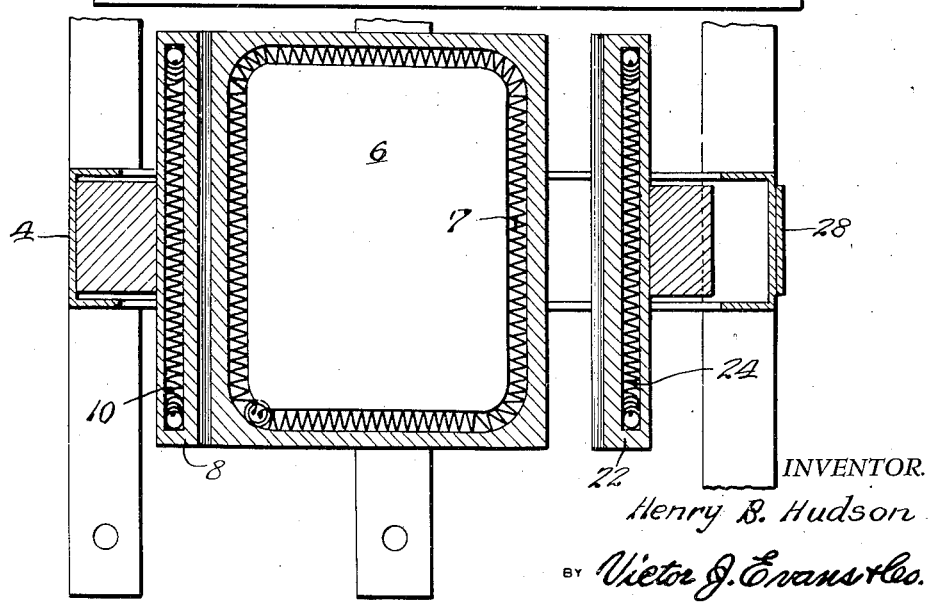
INVENTOR.
Henry B. Hudson
BY Victor J. Evans & Co.
ATTORNEYS March 15, 1949. H. B. HUDSON 2,464,232
TIRE VULCANIZER
Filed May 21, 1946 4 Sheets-Sheet 4
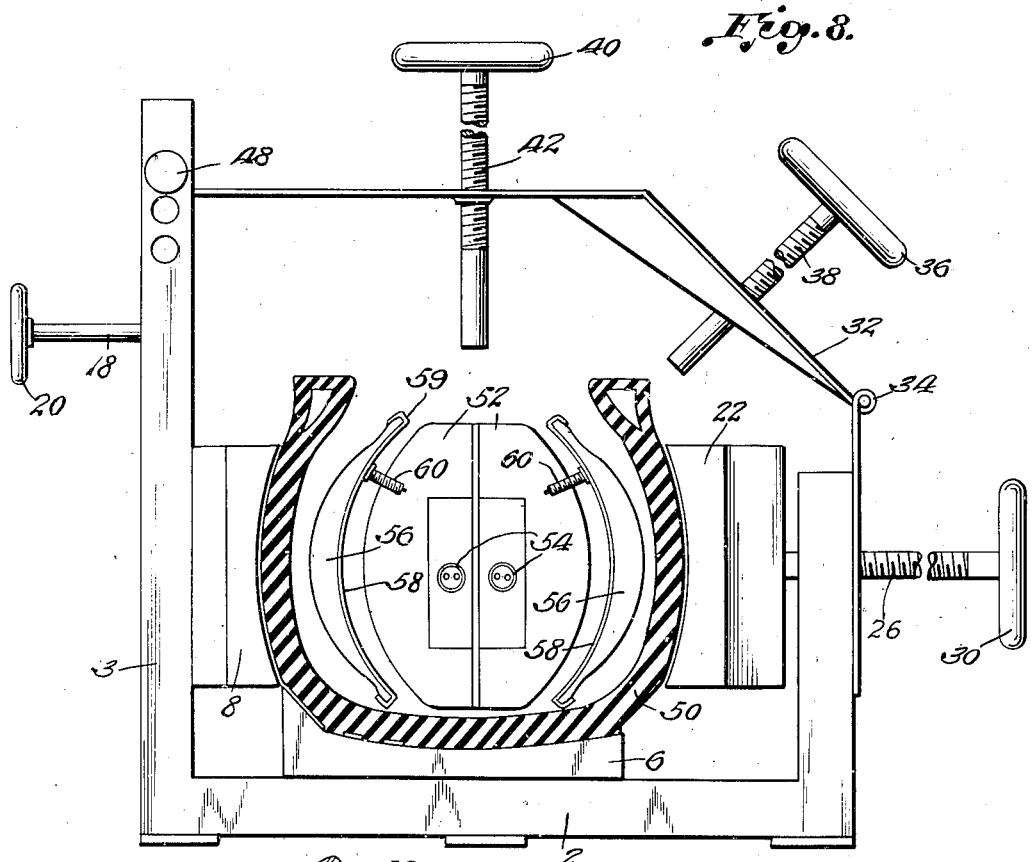
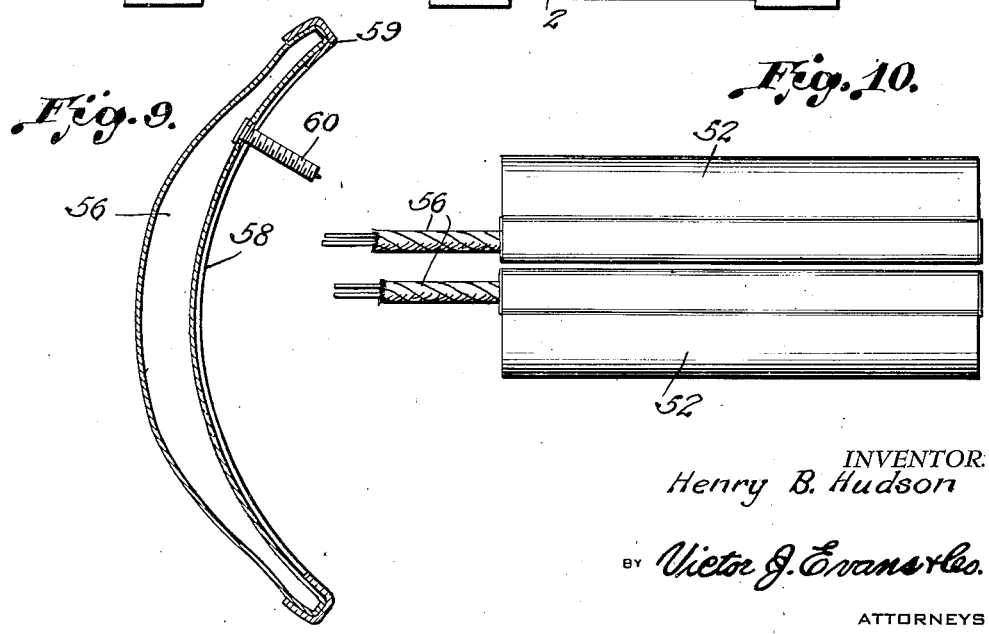
INVENTOR.
Henry B. Hudson
BY Victor J. Evans & Co.
ATTORNEYS Patented Mar. 15, 1949

2,464,232

UNITED STATES PATENT OFFICE 2,464,232

TIRE VULCANIZER

Henry B. Hudson, Orlando, Fla., assignor of one-half to Byron H. King, Jr., Orlando, Fla.

Application May 21, 1946, Serial No. 671,361

3 Claims. (Cl. 18—18)

1

My present invention relates to an improved tire vulcanizer and more particularly to the portable type of tire spot vulcanizer adapted to supply heat both interior and exterior of the tire casing to efficiently and easily repair cuts and breaks in tire casings.

The device of my invention is simple in operation and may with facility be employed to repair tires either on or off of the automobile in the case of exterior repairs, and the device is adjustable to accommodate tires of all sizes.

In carrying out my invention I employ a novel and unique combination of parts to accomplish the desired purpose and in the accompanying drawings I have illustrated one complete example of the physical embodiment of my invention according to the best mode I have thus far devised. It will be understood however, that various changes and alterations may be made in the exemplified structure within the scope of the appended claims.

In the drawings:

Figure 1 is an end elevational view of the vulcanizer of my invention.

Figure 2 is a top plan view thereof.

Figure 3 is a longitudinal vertical sectional view.

Figure 4 is a transverse vertical sectional view taken at line 4—4 of Figure 3.

Figure 5 is a transverse sectional view taken at line 5—5 of Figure 3.

Figure 6 is a horizontal sectional view taken at line 6—6 of Figure 3.

Figure 7 is a detail view of the strap securing means.

Figure 8 is an end elevational view showing a tire in position within the vulcanizer of my invention.

Figure 9 is a detail view in section of the inflatable air bag.

Figure 10 is a top plan view of the tire interior heating element.

Referring now to the drawings wherein like characters indicate like parts, I have illustrated a base frame 2 preferably of angle iron and having corner frames 3 of the same material.

Intermediate the corner frames on the side walls thereof I employ vertical posts 4 comprising U-shaped iron frames. Thus the vulcanizer housing consists in a skeleton framework.

Within this skeleton frame work I locate the various elements making up the vulcanizer and spot including the tread plate 6 having therein an electric coil 7. This tread plate rests on the lower portion of the frame and is designed to receive the tread portion of the tire to be repaired.

2

A side wall plate 8 including the electrical heating unit 10 is attached to a vertical post and vertical adjustment is provided for this plate to accommodate tires of different sizes in the bolt 12 attached to the plate and having a bevel gear 14 on the upper end thereof engaging a bevel gear 16 on shaft 18 and having wheel 20. Thus by rotation of the wheel 20 the bevel gears will cooperate to raise or lower the side plate 8, and wire 11 leads to an electricity source for heat.

An opposite side plate 22 is formed with shaft 26 journaled in the post 28 and a wheel on the shaft 28 as at 30 provides for lateral adjustment of the side plate 22 to accommodate tires of various sizes. Since the movement of the side plate 22 is controlled only on its movement inwardly a positive connection between the end of the shaft 26 and the side plate 22 is not required. Thus when the screw 26 is withdrawn for purposes of adjustment it will lose contact with the side plate 22. The plate being held in position manually until the screw 26 is again moved into engagement with the side plate to again exert inward pressure on the plate. The electrical cord or wire 24 provides connection to an electricity source for heating the side plate.

Above these three heating plates on the base and side posts of the frame, I have mounted a metal strip 32 hinged to the post 28 at 34 and an adjustment wheel 36 and its shaft 38 threadedly engage the strip for adjustment therewith. I also use a second adjustment wheel 40 and shaft 42 threadedly engaging the strip 32, and the inner free ends of these shafts are designed to provide retaining force for the tire bead and the tire interior heating elements.

The lateral strip 32 is formed with an end loop 44 and a pin 46 is designed to pass through selected holes 48 in the vertical post 4 and through the loop to secure the strip in the selected and desired position.

A tire being repaired is shown at 50, and after the tire has been placed within the frame and the side plates adjusted, the tire of course resting on the tread plate, I propose to insert within the casing adjacent the portion thereof requiring repair and vulcanizing, interior heating elements 52 having electrical coils 54 and to insure close contact and adequate pressure, the inflatable air bags 56 are placed between the interior heating elements and the interior wall of the tire casings. These air bags are preferably of rubber, elongated in shape and formed with heat transfer plates 58. The ends of the bags and plates are reinforced as at 59, and inflating stems are indicated at 60.

After the tire has been placed, the side wall plates adjusted to the size of the tire, and the interior plates inserted, the bags are inflated slightly, and then the adjustment wheels are turned in to engage the tire bead and the interior heating plates respectively. The repair material generally a rubber section has been previously located on the tire at the proper position either interior or exterior of the tire, or both if necessary, and the electrical connection is made through a switch, not shown, and the heating plates are heated through the coils and due to their positions in and about the tire casing, the heat for vulcanizing is spread over the entire area of the tire evenly to properly vulcanize the repair section and assure proper adherence of the repair section to the broken casing.

By the utilization of the vulcanizing device of my invention it will be apparent that an inexpensive and efficient operation is available eliminating the necessity for heavy and non-mobile equipment, and placing such inexpensive equipment as illustrated and described within the reach of every garage owner.

The use of electricity for heating the plates avoids the need for heavy structures as are required when steam is employed as the heating medium, and the frame of my invention may be moved from place to place with little effort.

Having thus fully described my invention what I claim as new and desire to secure by Letters Patent is:

1. A vulcanizing apparatus comprising a base portion, a pair of oppositely spaced posts projecting from and substantially normal to said base portion, one of said posts having a predetermined length greater than the other post and said posts adapted to receive a portion of a tire therebetween, a tread plate slidably positioned on said base portion between said posts and adapted to support the tire at the tread thereof, a first side wall plate slidably mounted on one of said posts and adapted to contact the side wall of the tire, manual means mounted on said one of said posts for adjusting said first side wall plate longitudinally along said post, a second side wall plate adapted to contact the other side wall of the tire, means on the other of said posts for adjustably positioning said second side wall plate laterally of said post, a split heating plate insertable within the tire, electrical means within all of said plates for heating the same, metallic supporting means for contacting opposite sides of said split heating plate, inflatable air bags secured to said metallic supporting means for exerting pressure upon the internal side walls of the tire, a clamp strip having portions formed at an angle to each other, means pivotally attaching one of said portions to the shorter of said posts, means adjustably securing the other of said portions to the other of said posts, screw means threadedly mounted in one of said portions for moving said split heating plate toward said tread plate to clamp the tire against said tread plate, and screw means threadedly mounted on the other of said portions and directed towards the position to be occupied by the bead of the tire for forcing the same against the split heating plate.

2. The combination defined in claim 1 wherein said plates have curved surfaces corresponding to the curvature of the tire.

3. The combination defined in claim 1 wherein the means adjustably securing the other of said portions to the other of said posts includes a series of openings in the other of said posts, a hook on said other of said portions and a pin insertable through said hook and a selected one of said series of openings.

HENRY B. HUDSON.

REFERENCES CITED

The following references are of record in the file of this patent:

UNITED STATES PATENTS

| Number | Name | Date |
| --- | --- | --- |
| 1,583,799 | Rutherford | May 11, 1926 |
| 1,640,281 | Marble | Aug. 23, 1927 |
| 1,842,124 | Schmidt | Jan. 19, 1932 |
| 1,905,463 | Grange | Apr. 25, 1933 |
| 2,063,069 | Wheelock | Dec. 8, 1936 |
| 2,158,703 | Kite | May 16, 1939 |
| 2,411,558 | Semler | Nov. 26, 1946 |